United States Patent [19]

Kimura et al.

[11] Patent Number: 4,900,769
[45] Date of Patent: Feb. 13, 1990

[54] ACETAL RESIN COMPOSITION

[75] Inventors: Masaharu Kimura, Toyonaka; Zenpei Mizutani; Hiroya Fujii, both of Yokkaichi, all of Japan

[73] Assignee: Mitsubishi Gas Chemical Company, Inc., Tokyo, Japan

[21] Appl. No.: 198,492

[22] Filed: May 25, 1988

[30] Foreign Application Priority Data

May 27, 1987 [JP] Japan .................. 62-127989

[51] Int. Cl.$^4$ .................. C08K 5/20; C08K 5/10
[52] U.S. Cl. .................. 524/227; 524/306; 524/311; 524/312; 524/593
[58] Field of Search .......... 524/227, 230, 593, 306, 524/311, 312

[56] References Cited

U.S. PATENT DOCUMENTS

| | | | |
|---|---|---|---|
| 3,340,219 | 9/1967 | Stemmler | 524/593 |
| 3,578,621 | 5/1971 | Stapfer | 524/306 |
| 3,808,133 | 4/1974 | Brown | 524/593 |
| 3,864,295 | 2/1975 | Boussely | 260/28.5 D |
| 4,274,986 | 6/1981 | Ikenaga et al. | 260/22 CQ |

FOREIGN PATENT DOCUMENTS 1314269  4/1973  United Kingdom .

OTHER PUBLICATIONS

EP A2 0110108 (Polyplastics), p. 5, lines 19 to p. 6, line 5.

Primary Examiner—Lewis T. Jacobs
Attorney, Agent, or Firm—Wenderoth, Lind & Ponack

[57] ABSTRACT

An acetal resin composition comprising (A) 100 parts of an acetal resin, (B) 0.01 to 2 parts by weight of a higher fatty acid ester derived from a polyhydric alcohol having 2 to 10 carbon atoms as an alcohol component and a higher fatty acid having 22 to 32 carbon atoms as an acid component and, optionally, (C) 0.01 to 2 parts by weight of a linear fatty acid having at least 10 carbon atoms.

4 Claims, No Drawings

ACETAL RESIN COMPOSITION

This invention relates to an acetal resin composition. More specifically, it relates to an acetal resin composition having highly improved releasability in injection molding without substantially impairing the inherent mechanical properties and thermal stability of the acetal resin and the appearance of an article molded from it.

In many cases, the acetal resin is injection-molded into machine component parts and precision mechanism parts of complex structures because it has excellent flowability as well as well-balanced mechanical properties, excellent abrasion resistance and excellent thermal stability. Such a complex structure includes, for example, thick-walled portions and thin-walled portions occasionally with tangled ultrathin-walled portions or hollow cylindrical protrusions. Furthermore, these parts are frequently small-sized with a weight of about several grams to several tens of grams.

Releasing of complexly figured articles from molds by ejection should be performed as smoothly as possible. If the articles are ejected with an excessively strong force, they may be broken or the molding strain may remain within the articles to exert an adverse effect during long-term use. To avoid such quite undesirable results, it has been eagerly desired to improve mold releasability.

Japanese Laid-Open Patent Publication No. 104151/1985 discloses an acetal resin composition of improved mold releasability which contains at least one higher fatty acid having 22 to 32 carbon atoms. Although this composition has sufficient mold releasability, it has the defect that when it is caused to stay for a long period of time at high temperatures within a molding machine, foaming occurs to develop silver streaks.

It is an object of this invention to provide a novel acetal resin composition.

Another object of this invention is to provide an acetal resin composition having highly improved mold releasability in injection molding without substantially impairing the inherent mechanical properties and thermal stability of the acetal resin and the appearance of an article molded from it.

Further objects of the invention along with its advantages will become apparent from the following description.

According to the invention, these objects and advantages are achieved firstly by an acetal resin composition comprising (A) 100 parts by weight of an acetal resin, and (B) 0.01 to 2 parts by weight of a higher fatty acid ester derived from a polyhydric alcohol having 2 to 10 carbon atoms as an alcohol component and a higher fatty acid having 22 to 32 carbon atoms as an acid component.

The higher fatty acid ester used in the composition of this invention denotes a compound derived from a polyhydric alcohol having 2 to 10 carbon atoms as an alcohol component and a higher fatty acid having 22 to 32 carbon atoms as an acid component and containing at least one ester group in the molecule.

The polyhydric alcohol is preferably a compound having at least 2, especially 2 to 6, alcoholic hydroxyl groups in the molecule. Examples include glycerol, diglycerol, pentaerythritol, sorbitan, ethylene glycol, diethylene glycol, trimethylolmethane and triethylolmethane.

The higher fatty acid may be linear or branched and may be saturated or unsaturated. It may be a monocarboxylic acid or a di- or higher polycarboxylic acid. Preferred examples include behenic acid, cerotic acid, montan acid, lacceric acid, erucic acid and ximenic acid.

The higher fatty acid ester is included in an amount of 0.01 to 2 parts by weight, preferably 0.05 to 0.3 parts by weight, per 100 parts by weight of the acetal resins.

The acetal resin used in the composition of this invention may, for example, be an oxymethylene homopolymer composed substantially of oxymethylene units, or an oxymethylene copolymer comprising not more than 20% by weight, for example 0.1 to 20% by weight, of oxyalkylene units having 2 to 8 carbon atoms.

The oxymethylene homopolymer can be produced, for example, by polymerizing a formaldehyde monomer of a cyclic oligomer thereof such as its trimer (trioxane) or its tetramer (tetroxane). The oxymethylene copolymer can be produced, for example, by copolymerizing the aforesaid monomer with a cyclic ether such as ethylene oxide, propylene oxide, epichlorohydrin, 1,3-dioxolane, 1,3-dioxepane, a formal of a glycol or a formal of a diglycol.

Investigations of the present inventors have shown that when a higher fatty acid amide is further included in the composition of this invention, the mold releasability of the composition can be more highly improved synergistically without impairing the thermal stability of the acetal resin.

Accordingly, the invention secondly provides an acetal resin composition comprising (A) 100 parts of an acetal resin, (B) 0.01 to 2 parts by weight of a higher fatty acid derived from a polyhydric alcohol having 2 to 10 carbon atoms as an alcohol component and a higher fatty acid having 22 to 32 carbon atoms as an acid component, and (C) 0.01 to 2 parts by weight of an amide of a linear fatty acid having at least 10 carbon atoms.

The acetal resin (A) and the higher fatty acid ester (B) are as already described.

The amide of a linear fatty acid having at least 10 carbon atoms used in the above composition is preferably an amide derived from a linear fatty acid having at least 10 carbon atoms, preferably 10 to 30 carbon atoms, as an acid component and ammonia, an aliphatic monoamine having 1 to 4 carbon atoms or an aliphatic diamine having 1 to 4 carbon atoms as an amine component. Diamides derived from 1 mole of aliphatic diamines and 2 moles of fatty acids having at least 10 carbon atoms are advantageously used.

Suitable examples of the amines are stearamide, ethylenebis-stearamide, methylenebis-stearamide, methylenebis-lauramide, palmitamide, and oleamide. Ethylenebis-stearamide, methylenebis-stearamide and methylenebis-lauramide are especially preferred.

The amide (C) is included in an amount of 0.01 to 2 parts by weight, preferably 0.05 to 0.3 part by weight, per 100 parts by weight of the acetal resin.

As required, known additives such as heat stabilizers, antioxidants, ultraviolet absorbers, pigments, fillers, glass fibers and carbon fibers may be incorporated in the composition of this invention.

The acetal resin composition of this invention may be produced by various methods which comprise mixing or melt-kneading the individual ingredients as an essential step.

For melt-kneading, general kneaders such as various extruders, kneaders, a Banbury mixer and a mixing roll may be used. The kneading may be done by a device performing gentle mixing such as a V-type blender or a device performing high-speed fluidized mixing; or by mixing the ingredients in the form of a solution, an emulsion, a suspension, etc. with stirring, drying the mixture, and putting the resulting mixture in the above kneader. Alternatively, it is possible to add the ester (B) or both the ester (B) and the higher fatty acid amide (C) to a homogeneous molten mass of the acetal resin in the above kneader.

The temperature for melt-kneading is properly selected depending upon various conditions such as the type of the acetal resin and the function of the mixing-kneading device. It is above the melting point of the acetal resin but below the decomposition temperatures of the additives, and preferably 175° to 230° C.

No clear cause of the marked effect of this invention has yet been determined. It is theorized however that since the ester (B) has suitable compatibility with the acetal resin, it forms an easily releasable layer in a boundary surface between the resin and the surface of the mold cavity, and the joint use of the higher fatty acid amide (C) facilitates formation of this layer.

The following Examples and Comparative Examples illustrate the present invention in greater detail.

In the following description, the intrinsic viscosity $[\eta]$ denotes a value measured at 60° C. in p-chlorophenol containing 2% by weight of alpha-pinene, and the amounts added (phr) mean parts by weight per 100 parts by weight of the acetal resin.

The tests conducted in the following examples were as follows:

Mold Releasing Force

Shape of the molded article: a bottomed cylindrical article having a height of 27 mm, an outside diameter of 34 mm and a thickness of 2 mm.

Mold releasing force: Detected by a sensor connected to an ejection pin positioned centrally at the bottom of the cylindrical article.

The sensor for measuring the mold releasing force: made by Techno Plus Co., Ltd.

Molding condition:
Injection molding machine, 1S-90B made by Toshiba Co., Ltd. Injection pressure: 800 kg/cm² Mold temperature: 60° C.

Color In The Initial Stage

Color difference meter: Hunter color difference meter (made by Suga Testing Instrument Co., Ltd.)

Color of the molded article before adding a molding releasing agent—$L_1$, $a_1$, $b_1$.

Color of the molded article after adding the mold releasing agent=$L_2$, $a_2$, $b_2$.

Calculating formula:

$$\Delta E = \sqrt{(L_2 - L_1)^2 + (a_2 - a_1)^2 + (b_2 - b_1)^2}$$

Standards of evaluation:
◎ : $\Delta E = 0$ to 1
○ : $\Delta E =$ more than 1 to 2
△: $\Delta E =$ more than 2 to 3
X: $\Delta E =$ more than 3 to 4

Color On Residence

Color difference meter: Hunter color difference meter (made by Suga Testing Instrument Co., Ltd.).

Injection molding machine: SJ-35A made by Meiki Seisakusho Co., Ltd.

Residence conditions: temperature of the composition 235° C.; residence time, 60 minutes.

Color of the molded article before residence=$L_3$, $a_3$, $b_3$.

Color of the molded article after residence=$L_4$, $a_4$, $b_4$.

Calculation formula:

$$\Delta E = \sqrt{(L_4 - L_3)^2 + (a_4 - a_3)^2 + (b_4 - b_3)^2}$$

Standards of evaluation:
◎ : $\Delta E = 0$ to 4
○ : $\Delta E =$ more than 4 to 6
△: $\Delta E =$ more than 6 to 8
X: $\Delta E =$ more than 8 to 10

Thermal Stability

Instruments used: DT-30 made by Shimazu Corporation.

Test: rate of thermal decomposition in air at 222° C.

Thermal Stability On Residence

Injection-molding machine used: SJ-35A made by Meiki Seisakuso Co., Ltd.

Residence conditions:
Resin temperature: 235° C.
Residence time: 60 minutes at the longest
Method of evaluation: An amount of the resin sufficient for 6 shots was caused to reside within the molding machine, and injection-molded every 10 minutes. The time at which silver streaks attributed to foaming of the resin began to occur (for example, if the silver streaks occurred in the third shot, this time is 30 minutes) was determined.

Tensile Impact Strength

Conditions for test sample molding:
Molding machine: SJ-35A made by Meiki Seisakusho Co., Ltd.
Resin temperaure: 200° C.
Injection pressure: 500 kg/cm²
Mold temperature: 80° C.

EXAMPLES 1–9 AND COMPARATIVE EXAMPLES 1–6

In each run, to an oxymethylene copolymer containing 2.5% by weight of copolymer units from ethylene oxide and having an intrinsic viscosity of 1.1 dl/g as an acetal resin were added 0.2 phr of melamine, 0.5 phr of triethylene glycol-bis-4-(3-t-butyl-4-hydroxy-5-methylphenyl)propionate, 0.1 phr of magnesium hydroxide and each of the fatty acid esters shown in the column of blended compound I in Table 1 in the amounts indicated. They were kneaded in a vent-equipped twin-screw extruder (L/D=30, diameter 50 mm) to produce an oxymethylene copolymer composition stabilized against heat.

The mold releasing force, thermal stability, thermal stability on residence and tensile impact strength of the resulting composition and the appearance (color) of a molded article prepared from it were measured. The results are shown in Table 1.

For comparison, Example 1 was repeated except that the mold releasing agent was not used (Comparative Example 1) or a mold releasing agent other than the higher fatty acid esters in accordance with this invention was used (Comparative Examples 2 to 6). The results are also shown in Table 1.

EXAMPLE 10 AND COMPARATIVE EXAMPLE 7

Example 1 and Comparative Example 1 were respectively repeated except that an oxymethylene homopolymer with an intrinsic viscosity of 1.3 dl/g in which the terminal hydroxyl groups were acetylated with acetic anhydride was used as the acetal resin. The results are shown in Table 1.

EXAMPLES 11-13 AND COMPARATIVE EXAMPLE 8

In each run, Example 1 was repeated except that each of the higher fatty acid esters shown in the column of blended compound I and each of the higher fatty acid amides in the column of blended compound II in Table 1 were used in combination as the mold releasing agent. The results are shown in Table 1.

For comparison, Example 11 was repeated except that only the higher fatty acid amide was used as the mold releasing agent. The results are shown in Table 1.

COMPARATIVE EXAMPLES 9-13

Samples were prepared in the same way as in Example 1 except that the higher fatty acids shown in Table 2 were used in the amounts indicated. Thermal stability on residence was measured on these samples, and the results are shown in Table 2.

TABLE 1

| Run | Blended compound I Type | Amount (phr) | Blended compound II Type | Amount (phr) | Mold releasing force (kg/cm²) | Appearance (color) Initial | Appearance (color) Residence | Thermal stability (%/min) | Thermal stability on residence (min) | Tensile impact strength (kg-cm/cm²) |
|---|---|---|---|---|---|---|---|---|---|---|
| Example | | | | | | | | | | |
| 1 | Behenyl monoglyceride | 0.2 | None | — | 55 | ◎ | ◎ | 0.04 | (*) 60 < | 135 |
| 2 | Behenyl monoglyceride | 0.1 | " | — | 60 | ◎ | ◎ | 0.04 | 60 < | 135 |
| 3 | Behenyl monoglyceride | 0.009 | " | — | 90 | ◎ | ◎ | 0.04 | 60 < | 135 |
| 4 | Behenyl monoglyceride | 0.3 | " | — | 45 | ◎ | ○ | 0.05 | 60 < | 130 |
| 5 | Sorbitan monobehenate | 0.2 | " | — | 60 | ◎ | ◎ | 0.04 | 60 < | 135 |
| 6 | Sorbitan erucinate | 0.2 | " | — | 60 | ◎ | ○ | 0.05 | 60 < | 135 |
| 7 | Cerotyl monoglyceride | 0.2 | " | — | 60 | ◎ | ○ | 0.05 | 60 < | 135 |
| 8 | Lacceryl monoglyceride | 0.2 | None | — | 60 | ◎ | ○ | 0.05 | 60 < | 135 |
| 9 | Montanyl monoglyceride | 0.2 | " | — | 60 | ◎ | ○ | 0.05 | 60 < | 135 |
| 10 | Behenyl monoglyceride | 0.2 | " | — | 60 | ◎ | △ | 0.09 | 60 < | 135 |
| 11 | Behenyl monoglyceride | 0.1 | Ethylenebis-stearamide | 0.1 | 45 | ◎ | ◎ | 0.04 | 60 < | 135 |
| 12 | Behenyl monoglyceride | 0.15 | Ethylenebis-stearamide | 0.1 | 40 | ◎ | ◎ | 0.04 | 60 < | 135 |
| 13 | Behenyl monoglyceride | 0.15 | Ethylenebis-stearamide | 0.15 | 40 | ◎ | ○ | 0.04 | 60 < | 130 |
| Comparative Example | | | | | | | | | | |
| 1 | None | — | None | — | 150 | ◎ | ◎ | 0.04 | — | 130 |
| 2 | Stearyl monoglyceride | 0.2 | " | — | 105 | ◎ | ◎ | 0.06 | — | 135 |
| 3 | Sorbitan monostearate | 0.2 | " | — | 115 | ◎ | ○ | 0.08 | — | 130 |
| 4 | Lauryl monoglyceride | 0.2 | " | — | 115 | ◎ | ○ | 0.08 | — | 130 |
| 5 | Sorbitan monolaurate | 0.2 | " | — | 115 | ◎ | ○ | 0.08 | — | 135 |
| 6 | Palmityl monoglyceride | 0.2 | " | — | 115 | ◎ | ○ | 0.08 | — | 135 |
| 7 | None | — | " | — | 155 | ◎ | △ | 0.09 | — | 135 |
| 8 | None | — | Ethylenebis-stearamide | 0.2 | 75 | ◎ | ○ | 0.04 | — | 135 |

(*): "60 <" Shows that no silver streak occurred before 60 minutes passed.

TABLE 2

| Comparative Example | Higher fatty acid Type | Amount (phr) | Thermal stability on residence (min.) |
|---|---|---|---|
| 9 | behenic acid | 0.1 | 40 |
| 10 | montan acid | 0.1 | 40 |
| 11 | cerotic acid | 0.1 | 40 |
| 12 | lacceric acid | 0.1 | 40 |
| 13 | behenic acid | 0.2 | 30 |

EXAMPLES 14-21

In each run, Example 1 was repeated except that each of the higher fatty acid esters shown in the column of blended compound I and each of the higher fatty acid amides in the column of blended compound II in Table 1 were used in combination as the mold releasing agent. The results are shown in Table 3.

TABLE 3

| Example | Blended compound I Type | Amount (phr) | Blended compound II Type | Amount (phr) | Mold releasing force (kg/cm$^2$) | Appearance (color) Initial | Appearance (color) Residence | Thermal stability (%/min) | Thermal stability on residence (min) | Tensile impact strength (kg-cm/cm$^2$) |
|---|---|---|---|---|---|---|---|---|---|---|
| 14 | Monoerucine | 0.2 | None | — | 60 | ◎ | ○ | 0.05 | 60 < | 130 |
| 15 | Ximenyl monoglyceride | 0.2 | None | — | 60 | ◎ | ○ | 0.05 | 60 < | 130 |
| 16 | Cerotyl monoglyceride | 0.15 | Ethylenebis-stearamide | 0.15 | 40 | ◎ | ○ | 0.05 | 60 < | 130 |
| 17 | Sorbitan monobehenate | 0.15 | Ethylenebis-stearamide | 0.15 | 40 | ◎ | ○ | 0.04 | 60 < | 130 |
| 18 | Sorbitan erucinate | 0.15 | Ethylenebis-stearamide | 0.15 | 40 | ◎ | ○ | 0.05 | 60 < | 130 |
| 19 | Behenyl monoglyceride | 0.15 | Methylenebis-stearamide | 0.15 | 40 | ◎ | ○ | 0.04 | 60 < | 130 |
| 20 | Behenyl monoglyceride | 0.15 | Stearamide | 0.15 | 45 | ◎ | ○ | 0.05 | 60 < | 130 |
| 21 | Sorbitan monobehenate | 0.15 | Methylenebis-stearamide | 0.15 | 40 | ◎ | ○ | 0.05 | 60 < | 130 |

What is claimed is:

1. An acetal resin composition comprising (A) 100 parts by weight of an acetal resin, and (B) 0.01 to 2 parts by weight of a higher fatty acid ester derived from a polyhydric alcohol having 2 to 10 carbon atoms as an alcohol component and a higher fatty acid having 22 to 32 carbon atoms as an acid component.

2. The composition of claim 1 wherein the acetal resin (A) is an oxymethylene copolymer containing not more than 20% by weight of oxyalkylene units having 2 to 8 carbon atoms.

3. The composition of claim 1 wherein the higher fatty acid ester (B) is an ester derived from a compound having at least two alcoholic hydroxyl groups in the molecule as an alcohol component and a linear saturated or unsaturated monocarboxylic acid as an acid component.

4. An acetal resin composition comprising (A) 100 parts by weight of an acetal resin, (B) 0.01 to 2 parts by weight of a higher fatty acid ester derived from a polyhydric alcohol having 2 to 10 carbon atoms as an alcohol component and a higher fatty acid having 22 to 32 carbon atoms as an acid component, and (C) 0.01 to 2 parts by weight of an amide selected from the group consisting of ethylene bis-stearamide, methylene bis-stearamide and methylene bis-lauramide.

* * * * *